Aug. 20, 1968 D. J. PAGE 3,398,311

ELECTROLUMINESCENT DEVICE

Filed Dec. 29, 1965

WITNESSES:

Bernard R. Gieguez

James F. Young

INVENTOR

Derrick J. Page

BY R. Lewis Gable

ATTORNEY

United States Patent Office 3,398,311
Patented Aug. 20, 1968

3,398,311

ELECTROLUMINESCENT DEVICE

Derrick J. Page, Wilkinsburg, Pa., assignor to Westinghouse Electric Corporation, Pittsburgh, Pa., a corporation of Pennsylvania Filed Dec. 29, 1965, Ser. No. 517,255
13 Claims. (Cl. 313—108)

ABSTRACT OF THE DISCLOSURE

This invention relates to a light emitting transistor and illustratively includes in one embodiment an emitter region made of a material having a sufficient band gap to emit visible radiation, and a base and a collector region forming a p-n region therebetween. More specifically, the base region forms a heterojunction with the emitter region such that the energy level of the conduction band of the emitter region is greater than the energy level of the conduction band of the base region and further so that the energy level of the valence band of the emitter region is less at the junction than the energy level of the valence band of the base region. By so structuring the heterojunction formed between the emitter and base regions, the radiation emitting transistor may be operated to have a significant current flow therethrough and to allow electropositive holes to be injected from the base region into the emitter region for providing an efficient generation of radiation.

This invention relates to electroluminescent devices and particularly to such devices in which the phenomena of recombination of electrons and electropositive holes is utilized to generate light.

Further, this invention relates to the process of generating light in semiconductor type phosphors by the recombination of electrons and electropositive holes. In order to understand this phenomena, a brief theoretical explanation will be given. A theoretical model has been presented in which the electrons associated with the nucleus of an element are disposed in discrete energy levels of quanta about the nucleus. In order for the individual atoms of an element to be associated with each other, the electrons of the adjacent atoms are related with respect to each other so as to form a bond between the neighboring atoms. In the crystalline structure formed by such semiconductive materials such as germanium and silicon, a diamond lattice is formed in which each atom is surrounded or associated with four other atoms. These semiconductive materials typically are made up of atoms having four electrons at the valence band or level of energy which are available to form covalent bonds with each of four other atoms disposed thereabout. Each covalent bond typically consists of a pair of shared electrons. All four electrons within the valence band are needed to form the crystal, and the resultant covalent bonds formed between each of the atoms is very strong. Due to the nature of the covalent bonds, there are no free electrons associated with these crystalline structures. Because there are no free electrons or other free electric charges present, electrical conduction is minimal. However, at relatively high temperatures, thermal vibration may be induced in the covalent bonds and some of these bonds may be broken to thereby release electrons which may form an electric current. However, excess electrons can be made available by adding impurities to the semiconductor structures which in effect act to break up the covalent bonds. With the addition of impurities known as "donors," the semiconductor is known as n-type. Conversely, atoms of an impurity material, which provide a structure with a deficit of electrons or holes, are called acceptors, and the semiconductor material is known as p-type.

The electrons making up a covalent bond are normally unable to move in an electrical field of ordinary intensity and thus do not contribute to the electrical conductivity of the semiconductive material. However, if energy such as in the form of visible light is allowed to fall on the semiconductor material, some of the valence electrons are ejected from these bonds leaving behind an electron deficit or positive holes. The electrons are said to move from the valence band or level of energy to the conduction band. Both the ejected electrons and holes are capable of moving in an electric field so that the conductivity is increased. As the wavelength of light used to irradiate the crystal is increased, the incident quanta of light have progressively less energy in accordance with the equation:

$$E=h\nu=\frac{hc}{\lambda}$$

where E is the energy of the light quanta, $h$ is Planck's constant, $\nu$ is the frequency of the light, $\lambda$ is the wavelength of the light, and $c$ is the velocity of light. If the quanta of the light is so determined to impart sufficient energy to the covalent bond, an electron will be ejected from the valence band to the conduction band; as a result, the conductivity of the semiconductive body will be increased.

In a reverse of this process, electrons may go from the conduction band to the valence band thereby releasing an amount of energy equal to that required to eject the electron from its bond. Conceivably, this energy may appear either in the form of quanta of light or it may appear as quanta of thermal lattice vibrations of the crystal structure, or both. It is noted at this point that the region between the valence band the conduction band is called the forbidden region of energies, which may not normally be occupied by electrons. The amount of energy required to rupture a covalent bond is equal to the width of the forbidden region or zone and thus when the bond is ruptured an electron in the valence band jumps the forbidden zone and ends up in the conduction band. However, it has been discovered from the precise measurement of the wavelength of light emitted when the electron has left the conduction band that there is an apparent discrepancy between the amount of energy associated with the quanta of light so emitted and the measured width of the forbidden zone. In order to account for this discrepancy, it has been proposed that there are discrete levels of energy to which an electron may be raised within the forbidden zone. These levels of energy are typically known as trap levels or recombination centers. In this theoretical model, it has been proposed that the electrons leave the conduction band and fall to the recombination center thereby giving up a specific quantum of light which corresponds to that viewed. In a second step, the electron proceeds from the recombination center to the valence band which accounts for the remaining portion of the total amount of energy corresponding to the measured width of the forbidden zone.

Luminescent or the generation of light has been achieved in semiconductor type phosphors such as zinc sulfide and cadmium sulfide by the recombination of electrons and electropositive holes. In the theoretical model described above, the electrons may be pictured as falling from the conduction band to the recombination centers whereas the holes may be thought of as jumping from the conduction band to the recombination centers. However, it has been found necessary to operate these devices at very low temperatures in order to produce visible light. In particular examples of the prior art, electroluminescent diodes have been incorporated within a Dewar flask so that a refrigerant such as liquid nitrogen or hydrogen can be circulated about the semiconductor body. At such temperatures of approximately 77.4° K. (i.e., the temperature of liquid nitrogen) or at 21.5° K. (i.e. the temperature of liquid hydrogen), these luminescent devices were able to efficiently emit light. At such temperatures, an electroluminescent diode constructed from a single crystal of cadmium sulfide was observed to give off a visible light that was of a green hue and highly monochromatic. Unfortunately, the efficiency of such device was very low and a typical current of 100 milliamps was necessary to operate this device. However, when the temperature of such devices was raised, it was found that the efficiency of these devices dropped off rapidly and that at room temperatures in excess of 0° C., such devices were found to be impractical as light emitters. This may be in part explained by the possibility that the rise in temperature imparts to the electrons within the semiconductor body sufficient energy to occupy the recombination center and thereby prevent electrons in the conduction band from moving to this energy level. In any event, it has been discovered that such devices at room temperature are extremely inefficient light producers and/or require an excessive amount of current to produce usable quantities of light.

Accordingly, an object of the present invention is to provide a new and improved electroluminescent device which may efficiently generate light at room temperatures.

Another object of this invention is to provide a new and improved electroluminescent device which may be operated without the necessity of using additional cooling means to provide an efficient light generation.

A still further object of this invention is to provide a new and improved electroluminescent device which has a built-in gain.

Another object of this invention is to provide a new and improved electroluminescent device which may be easily incorporated into those miniaturized, integrated circuits which may be formed upon a single semiconductor chip.

Briefly, the objects of this invention are accomplished by an electroluminescent device having a first region of a semiconductive material with a sufficiently wide band gap between the valence and conduction bands to permit injection luminescence, and second and third semiconductive regions of opposite types of conductivity to form a p-n junction therebetween. Further, the first region capable of electroluminescence forms with said second region a heterojunction having such a discontinuity of the conduction band so as to permit the injection of electropositive holes into the first region from the second region. Thus, when electrons are injected as by an ohmic contact applied to the first region, recombination of electrons and holes may take place within the first region which has a sufficiently wide band gap to provide the desired emission of light. Further, the p-n junction established between said second and third regions of the semiconductive material is reverse biased to provide a current gain within said electroluminescent device and to thereby increase the number of electrons injected within the first region of electroluminescent material. As a result, a greater number of electrons are introduced into the first region and an increased number of electrons are available to recombine with electropositive holes at the recombination centers to thereby efficiently generate light.

It is a further aspect of this invention that the electroluminescent material be selected from those compounds formed from the second and sixth classes of natural elements. Illustratively, such compounds as zinc oxide, zinc sulfide, zinc telluride, cadmium oxide, cadmium sulfide, and cadmium telluride have band gaps greater than 1.6 electron volts which is sufficient to produce light in the visible region.

Further objects and advantages of the invention will be set out in the following description. For a better understanding of the invention, reference may be had to the accompanying drawings, in which.

Figure 1:
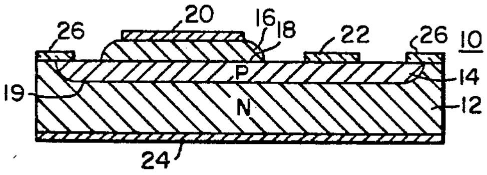
FIGURE 1 is a cross-sectional view of an electroluminescent device in accordance with this invention.

Referring now to the drawings and in particular to FIG. 1, there is shown an electroluminescent device 10 including a region or substrate 12 of a suitable semiconductive material such as silicon which has been doped to have an n-type conductivity. A second region 14 of p-type conductivity is disposed upon the first region 12 to thereby form a p–n junction 19 therebetween. A contact 24 is formed as a layer of nickel upon the base of the first region 12. A second contact 22 of a suitable electrically conductive material such as aluminum is alloyed upon the exposed surface of the second region 14. Further, a third region 16 of a suitable electroluminescent material such as cadmium sulfide is deposited on a portion of the surface of the second region 14 to form a heterojunction 18 between the regions 14 and 16. For the purposes of describing the invention, a heterojunction may be defined as a junction between two dissimilar semiconducting materials. A contact 20 made of a suitable electrically conductive material such as indium is disposed upon the third region 16. A layer 26 of a suitable electrically insulating material such as silicon dioxide is formed over the p–n junction 19 upon the surface of the regions 12 and 14 to thereby protect the junction 19.

Figure 2A:
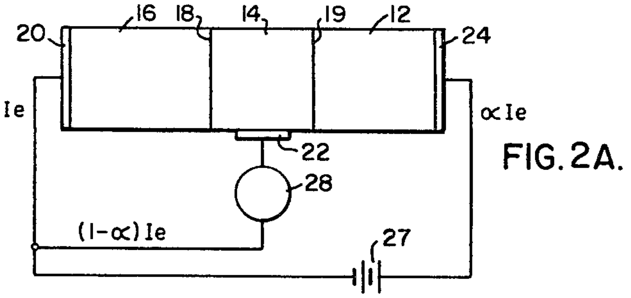
FIG. 2A is a schematic representation of the electroluminescent device shown in FIG. 1.

Referring now to FIG. 2A, a common emitter type of circuit is formed with a signal applied as by potential source 28 between the second or base region 14 through the electrical contact 22 and emitter region 16 through contact 20. Further, a biasing potential is applied as by a potential source 27 between the contacts 20 and 24 to thereby reverse bias the p–n junction 19.

Illustratively, the electroluminescent device 10 was formed by the following process. First, substrate 12 was formed by doping a chip of silicon with a donor impurity such as phosphor to thereby provide an n-type region. Next, the p-n junction 19 was fromed by diffusing boron into the one ohm centimeter n-type region 12 to form a 200 ohms per square degenerate layer with a surface concentration of approximately $10^{-19}$ per cm.$^3$. Specifically, the silicon chip was first cleaned and oxidized to a depth of 3000 A. By typical photoresist techniques, windows were fabricated in the oxide and a suitable acceptor impurity such as boron was deposited in a furnace for 5 minutes at 987° C. Next, the substrate was further heated in the presence of water vapor for approximately 2 minutes. The oxide disposed upon the silicon chip is then removed from prescribed areas of the surface to allow the deposition of the alloyed aluminum contact 22 and to retain the layer 26 of insulating material over the p-n junction 19.

The cadmium sulfide layer 16 is then vacuum evaporated through a mask onto the exposed surface of the p-type region 14. The substrate is first given a 10 second etch in an atomsphere of buffered hydrogen fluoride to remove the oxide on the p-type region 14. Next, the substrate containing the p-n junction is loaded into a substrate holder made of a suitable material such as Kovar (a trademark for an alloy of nickel, iron and cobalt of the Westinghous Electric Corporation). The substrate is then evacuated to a pressure of approximately $10^{-7}$ torr and then heated as by a projector lamp to a temperature of 450° C. for approximately 10 minutes to clean the surface of the substrate. The substrate is then cooled to approximately 200° C. and the source of cadmium sulfide is heated to approximately 700° C. to begin the evaporation process. The cadmium sulfide is allowed to be deposited upon the surface of the substrate until a layer was formed in the order of 5$\mu$ thick. Next, the coating or layer 16 of cadmium sulfide is doped with appropriate activators such as silver and chlorine to a density of approximately $10^{18}$ per cubic centimeter. The contact 20 is applied by evaporating a suitable conductive material such as indium through a mask onto the layer 16. Finally, the contact 24 may be applied as by a vacuum deposition of a layer of a suitable conductive material such as nickel.

Figure 2B:
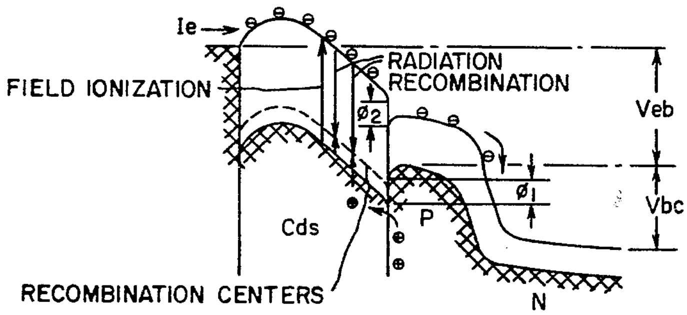
FIGS. 2B and 2C illustrate graphically the energy bands of the electroluminescent device shown in FIG. 2A and FIG. 1.
Figure 2C:
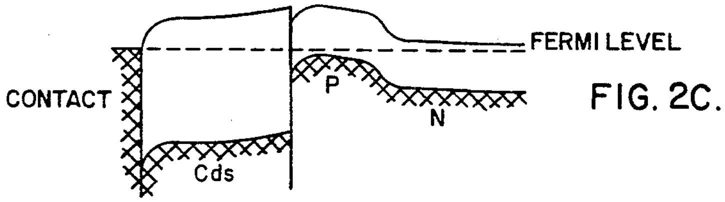

FIGS. 2B and 2C illustrate the electronic energy states considered to be present in the electroluminescent device 10 as described above. The diagram shown in FIG. 2C illustrates the energy states of the device 10 when no potentials are applied. As shown therein, a normal p-n junction is formed between the p-type region 14 and the n-type region 12. Further, a heterojunction 18 is formed between the cadmium sulfide region 16 and the p-type region 18. FIG. 2B illustrates the reaction of the energy states when a potential is applied between contacts 20 and 24. As shown in FIG. 2B, there are the usual charge carriers (i.e. holes and electrons). Further, additional auxiliary energy states or recombination centers (as indicated by the dotted line) are present by reason of the inclusion of the impurity activators copper and silver as previously mentioned. As shown, the electrons injected by the contact 20 flow across the cadmium sulfide region 16 under space-charge-limited current conditions to the n-type region 12 to be collected by the contact 24. Light emission as explained above, occurs within the cadmium sulfide region 16 due to the recombination of holes and the electrons across the wide band gap at the recombination centers. Though the theory of operation is not completely certain, it is believed that the recombination of the holes in the electrons takes place in either or both of the following ways. In either process, the electrons are injected as by the contact 20 into the conduction band of the electroluminescent region 16. Accordingly to one explanation, the electrons are accelerated to such a velocity that they extricate electrons from the valence band into the conduction band thereby leaving a hole within the valence band of this region. This is shown in FIG. 2B by the arrow designated field ionization. Next, an electron from the conduction band jumps from the conduction band to one of the recombination centers located upon the dotted line above the valence band, and a quantum of light of the energy difference between the conduction band and the recombination center is emitted. The electropositive holes within the valence band may be thought of as jumping to the recombination centers thus completing the chain of events. Though in the diagram shown in FIG. 2B, the recombination centers are shown adjacent the valence band, it is not certain that this model is correct and the recombination centers may well be located adjacent the conduction band. A second explanation of the generation of light is accomplished by the injection of holes from the p-type region 14 into the electroluminescent region 16. The holes in turn jump into the recombination centers to thereby annihilate the electrons jumping from the conduction band and to thereby emit the desired radiation.

It is an important aspect of this invention that the material of which electroluminescent region 16 is made have a large bandwidth preferably in excess of 1.6 electron volts. It has been ascertained that a material with such a band gap will produce light which is in the visible region. In accordance with the teachings of this invention, the elements forming the electroluminescent material may be a compound with one element selected from the Group II and the other element selected from the Group VI of elements; more specifically, the electroluminescent material may be selected from the following group of materials: zinc oxide (3.2 electron volts), zinc sulfide (3.6 electron volts), zinc selenide (2.67 electron volts), zinc telluride (2.2 electron volts), cadmium sulfide (2.51 electron volts), and cadmium selenide (1.81 electron volts).

In the present state of the art, it is believed impossible to form both a p-type region and an n-type region in a single material capable of luminescense such as listed above. The theory is advanced that the structure of Class II–IV compounds will not accept acceptors and that a compensation action will take place whereby the structure will form donors for each acceptor placed into the structure of these compounds. Therefore, the material of which the base region 14 and the collector region 12 is made is selected from the Group IV elements such as silicon and germanium or from the Group III–V compounds such as gallium arsenide, indium arsenide and gallium phosphide. These materials can be so doped to form p-type regions and also form a heterojunction with the emitter region 16 of electroluminescent material. Further, different techniques as described above are available to deposit these materials on a substrate.

The emission of light appears to be dependent upon the rate of recombination between holes and electrons. In turn, the rate of recombination depends upon the availability of holes within the conduction bands, i.e., the greater number of holes produced, the greater the number of recombinations. As mentioned above and as shown in FIG. 2B, a heterojunction 18 is formed between the p-type region 14 and the emitter region 16. The formation of such a heterojunction as will be explained is an important aspect of providing a sufficient number of holes within the cadmium sulfide region 16. First, it may be observed that the band gap of the region 16 is larger than that of the p-type silicon material of which the region 14 is made. Illustratively, cadmium sulfide may have a band gap of approximately 2.51 whereas silicon may have a band gap of approximately 1.1 electron volts. Due to the type of junction formed between these two materials and the relative band gaps thereof, discontinuities designated by $\phi_1$ and $\phi_2$ appear at the junction between the two regions 14 and 16. It is an important aspect of this invention that $\phi_1$ be as small as possible (less than 0.3 ev.) so as to facilitate the injection of holes from the p-type regions into the electroluminescent region 16. For values of $\phi_1$ in excess of 0.3 ev., the hole injection efficiently is exponentially reduced thereby rendering the device incapable of producing visible light. On the other hand, it is significant that the discontinuity as presented by $\phi_2$ exists between the conduction band of emitter region 16 and the conduction band of the region 14 and that energy level of the conduction band of region 16 is greater than that of the base or p-type region 14. It has been found impossible to operate the device as shown in FIGS. 1 and 2A with a reverse bias potential with the electrons going from the contact 24 to the contact 20. As may be seen in FIGS. 2C and 2B, a sharp step appears in the conduction band between the regions 14 and 16 which effectively prevents the electrons from passing this junction in the opposite direction.

As stated above, the rate of recombination and thus the efficiency of the light emission appears to be dependent upon the recombination of holes and electrons. Thus, if a larger current is injected through the contact 20 into the electroluminescent region 16, more electrons will be available to jump into the recombination centers to thereby increase the rate of recombination and increase intensity of the emission of light. Thus, it is an important aspect of this invention to increase the amount of current flowing through the electroluminescent device 10. As shown in FIG. 2A, the source 27 provides a reverse bias potential across the p-n junction 19. The high resistance of the reverse biased junction 19 allows a significant power gain to be achieved by this device. An input signal is applied as by the source 28 through the contact 22 to the second or base region 14 to thereby control the flow of current. The current flowing into the base region 14 is significantly smaller than that flowing into the collector region 12. As a result, a current gain in the order of 100 is obtained due to this transistor mechanism. In a study of electroluminescent cadmium sulfide diodes, it was found necessary to pass approximately 100 milliamps of current at 10 volts to produce sufficient light to be observable, which corresponds to a quantum efficiency of $10^{-4}$. However, with the electroluminescent device as shown in FIGS. 2A and 1, a current gain in the order of approximately 100 may be achieved. The input found necessary to illuminate this device is reduced to approximately 10 milliwatts and the effective quantum efficiency is approximately $10^{-2}$.

Thus there has been disclosed a semiconductive device capable of giving off light without the use of cooling devices. Such a structure would have application in molecular electronic circuits to provide an indication of the logic or function of the circuitry. Further, a plurality of the electroluminescent devices described herein could be incorporated in array to provide a visual display of a complex image or pattern of information.

Although the present invention has been described with a certain degree of particularity, it should be understood that the present disclosure has been made only by way of example and that numerous changes in the details of the circuitry and the combination and arrangement of the parts and elements can be resorted to without departing from the scope and spirit of the present invention.

I claim as my invention:

1. An electroluminescent device comprising emitter, base and collector regions; said emitter region being made of a material doped with dopants to provide recombination centers and having a band gap of sufficient width to emit visible radiation, said base and collector region respectively made of a p-type and an n-type semiconductive material to form a p-n junction therebetween; and a heterojunction formed between said emitter region and said base region.

2. An electroluminescent device as claimed in claim 1, wherein the discontinuity between the valence band of said emitter region and the valence band of said base region is of sufficient value to allow holes to be injected from said base region into said emitter region.

3. An electroluminescent device as claimed in claim 1, wherein said emitter region is made of cadmium sulfide.

4. An electroluminescent device as claimed in claim 1, wherein said emitter region is made of a compound having an element of the II Group and an element of the VI Group.

5. An electroluminescent device as claimed in claim 1, wherein said base region is made of a material selected from the group consisting of silicon, germanium, gallium arsenide, indium arsenide and gallium phosphide.

6. An electroluminescent device as claimed in claim 1, wherein said emitter region is made of a material selected from the group consisting of zinc oxide, zinc sulphide, zinc selenide, zinc telluride, cadmium sulphide and cadmium selenide.

7. A light producing system including the electroluminescent device claimed in claim 1 including means for reverse biasing said p-n junction, and means for applying an input signal to said base region.

8. An electroluminescent device as claimed in claim 1, where said base regions and said collector region comprise a single type of semiconductive material which is so doped to be respectively of p-type and n-type conductivities.

9. An electroluminescent device as claimed in claim 1, wherein the energy level of the conduction band of said emitter region is greater at said heterojunction than the energy level of the conduction band of said base region.

10. An electroluminescent device as claimed in claim 1, wherein the energy level of the valence band of said base region is greater at said heterojunction than the energy level of the valence band of said emitter region to thereby allow electropositive holes to be injected from said base region into said emitter region.

11. An electroluminescent device as claimed in claim 10, wherein the energy level of the conduction band of said emitter region is greater at said heterojunction than the energy level of the conduction band of said base region.

12. A radiation emitting system including the electroluminescent device claimed in claim 1 including means for forward biasing said heterojunction.

13. An electroluminescent device as claimed in claim 1, wherein said dopants are selected from a group comprised of silver and chlorine.

References Cited

UNITED STATES PATENTS

| | | | |
|---|---|---|---|
| 3,207,939 | 9/1965 | Mason | 313—108 |
| 3,283,207 | 11/1966 | Klein | 317—235.47 |

OTHER REFERENCES

Augusta, Heterojunction Transistor, February 1965, IBM Technical Disclosure Bulletin, vol. 7, No. 9, pp. 849–850.

Fischer, "Injection Electroluminescence," Solid State Electronics, 1961, pp. 232–246.

Norwood et al.: Injection Luminescence in GaAs Transistors, February 1965, Applied Physics Letters, vol. 6, No. 4, pp. 71–73.

O'Sullivan et al.: High-Current-Density Injection Electroluminescence in CdS, January 1965, Applied Physics Letters, vol. 6, No. 1, pp. 5–6.

JAMES W. LAWRENCE, *Primary Examiner.*

R. JUDD, *Assistant Examiner.*